(No Model.)
H. P. MALLISON.
CHAIN FOR TRANSMITTING MOTION.
No. 356,324. Patented Jan. 18, 1887.
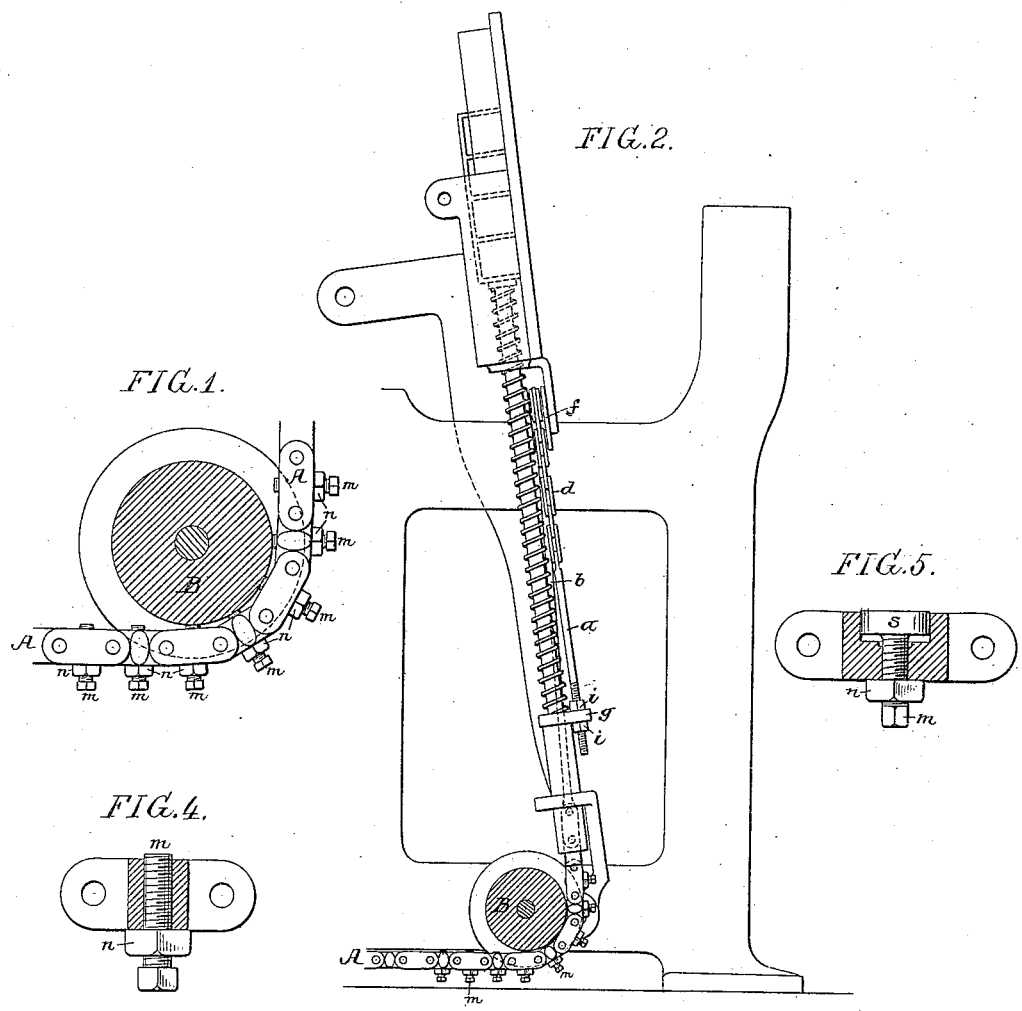
Witnesses:
John E. Parker
William D. Connor
Inventor:
Harvey P. Mallison,
by his Attorneys,
Howson & Sons

UNITED STATES PATENT OFFICE.

HARVEY P. MALLISON, OF PHILADELPHIA, PENNSYLVANIA.

CHAIN FOR TRANSMITTING MOTION.

SPECIFICATION forming part of Letters Patent No. 356,324, dated January 18, 1887.

Application filed September 25, 1886. Serial No. 214,524. (No model.)

*To all whom it may concern:*

Be it known that I, HARVEY P. MALLISON, a citizen of the United States, residing in Philadelphia, Pennsylvania, have invented certain Improvements in Chains for Transmitting Motion, of which the following is a specification.

My invention relates to devices whereby a variable intermittent movement is transmitted from one moving part of a machine to another by means of a chain passing round a wheel or pulley, and especially to devices of this class in which the actuated part is required to stop in a certain position after each movement, the object of my invention being to provide simple means whereby the desired accuracy in the movement of the actuated part may at all times be insured. This object I attain in the manner which I will now proceed to describe, reference being had to the accompanying drawings, in which—

Figure 1 is a diagram illustrating the main feature of my invention. Fig. 2 is a side view of part of a loom, illustrating one application of my invention. Fig. 3 is a perspective view, on an enlarged scale, of part of the chain shown in Figs. 1 and 2. Fig. 4 is a longitudinal section of one of the links of said chain, and Fig. 5 is a similar section showing a modification of my invention.

In machinery in which a variable intermittent movement is transmitted from one part to another by means of a chain passing round a wheel or pulley, accuracy in the movement of the actuated part is prevented after a short time by reason of uneven wear of those links of the chain A which, by the movement of the latter, are caused to pass round the bearing wheel or pulley. For instance, in the case of the drop box-operating mechanism of a loom, in which such transmitting device is used, it frequently happens that some of the boxes are but rarely brought into action. Consequently, some of the links of the chain and some parts of the periphery of the bearing-wheel are subjected to much less wear than others.

General variations in the movement of the boxes can be compensated for by the adjustment of a rod, $a$, which is connected to the chain A by a rod, $b$, and a chain, $d$, passing round a pulley, $f$, on the lathe, the rod $a$ passing through a stud, $g$, on the lathe and being threaded for the reception of adjusting-nuts $i$ on opposite sides of the stud. This adjustment, however, is not available as a means of compensating for local variations of movement due to the uneven wear of the links of the chain; hence, in carrying out my invention I provide each of the links in that portion of the chain which is caused to pass round the bearing-wheel B with means for taking up its own wear, so that the center line of each link may at all times be caused to occupy a position at a certain distance from the center or axis of the bearing-wheel.

The means which I prefer for taking up wear of the links is a simple set-screw, $m$, passing through a threaded opening in the body of the link, and provided, by preference, with a jam-nut, $n$, so as to prevent accidental loosening of the set-screw after it has been adjusted. The inner end of the set-screw thus serves as the bearing-point of the link, and the area of this bearing can, if desired, be increased by providing the inner end of the set-screw with an enlarged head, $s$, such as shown, for instance, in Fig. 5.

I claim as my invention—

1. The combination of a wheel or pulley and a chain passing round the same and serving as a means of transmitting motion from one portion of a machine to another, with set-screws adapted to the links of the chain and forming the bearing-surfaces of said links, all substantially as specified.

2. A transmitting-chain having links with set-screws forming the bearing-surfaces of the links, all substantially as specified.

In testimony whereof I have signed my name to this specification in the presence of two subscribing witnesses.

HARVEY P. MALLISON.

Witnesses:
 HENRY HOWSON,
 HARRY SMITH.